United States Patent
Brusky et al.

(10) Patent No.: US 11,210,078 B2
(45) Date of Patent: *Dec. 28, 2021

(54) ACTION EXECUTION BASED ON MANAGEMENT CONTROLLER ACTION REQUEST

(71) Applicant: HEWLETT PACKARD ENTERPRISE DEVELOPMENT LP, Houston, TX (US)

(72) Inventors: Kevin J Brusky, Houston, TX (US); Bryan Jacquot, Fort Collins, CO (US); Phil Prasek, Bellevue, WA (US); Erick Armando Gomez, Houston, TX (US); Maneksha Basheer, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/930,587

(22) Filed: May 13, 2020

(65) Prior Publication Data

US 2020/0272447 A1   Aug. 27, 2020

Related U.S. Application Data

(63) Continuation of application No. 15/305,430, filed as application No. PCT/US2014/041300 on Jun. 6, 2014, now Pat. No. 10,691,440.

(51) Int. Cl.
| | |
|---|---|
| *G06F 9/44* | (2018.01) |
| *G06F 9/455* | (2018.01) |
| *G06F 8/65* | (2018.01) |
| *G06F 9/06* | (2006.01) |

(52) U.S. Cl.
CPC . *G06F 8/65* (2013.01); *G06F 9/06* (2013.01)

(58) Field of Classification Search
CPC .................................... G06F 8/65; G06F 9/06
See application file for complete search history.

(56) References Cited

U.S. PATENT DOCUMENTS

| | | |
|---|---|---|
| 6,167,567 A | 12/2000 | Chiles et al. |
| 6,317,742 B1 | 11/2001 | Nagaratnam et al. |
| 7,421,688 B1 | 9/2008 | Righi et al. |

(Continued)

FOREIGN PATENT DOCUMENTS

EP   2607987 A1   6/2013

OTHER PUBLICATIONS

IBM, IBM System Storage N series Clustered, 2013, pp. 1-462. http://www.redbooks.ibm.com/redbooks/pdfs/sg248200.pdf (Year: 2013).*

(Continued)

*Primary Examiner* — Mongbao Nguyen
(74) *Attorney, Agent, or Firm* — Hewlett Packard Enterprise Patent Department

(57) ABSTRACT

Techniques for action execution based on management controller received action requests are provided. In one aspect, a utility program running under the control of an operating system on a server computer may retrieve an indication of an action request. The action request may be stored in a management controller accessible storage. Storage of the action request may not require operating system administrator credentials. The action specified in the request may be executed by the utility program.

17 Claims, 6 Drawing Sheets

(56) References Cited

U.S. PATENT DOCUMENTS

| | | | |
|---|---|---|---|
| 7,484,084 | B1 | 1/2009 | Ranaweera et al. |
| 7,594,107 | B1 | 9/2009 | Parkhill |
| 7,752,615 | B1 | 7/2010 | Perry et al. |
| 8,843,917 | B1 | 9/2014 | Harel et al. |
| 8,910,283 | B1 | 12/2014 | Gusarov et al. |
| 8,924,547 | B1* | 12/2014 | Belk .................. H04L 41/0816 709/224 |
| 9,058,251 | B1* | 6/2015 | Dorwin ............... G06F 11/3003 |
| 9,208,338 | B2 | 12/2015 | Patidar et al. |
| 9,335,986 | B1* | 5/2016 | Bowen .................... G06F 8/656 |
| 10,177,934 | B1 | 1/2019 | Marr et al. |
| 2005/0102680 | A1 | 5/2005 | Pettigrew |
| 2005/0229173 | A1* | 10/2005 | Mihm ....................... G06F 8/65 717/171 |
| 2007/0199068 | A1 | 8/2007 | Russinovich et al. |
| 2008/0098094 | A1* | 4/2008 | Finkelstein ........... G06F 9/4411 709/220 |
| 2009/0007095 | A1 | 1/2009 | Alverson et al. |
| 2009/0007256 | A1 | 1/2009 | Raymond et al. |
| 2009/0259749 | A1 | 10/2009 | Barrett et al. |
| 2010/0281173 | A1 | 11/2010 | Vutukuri et al. |
| 2011/0030036 | A1 | 2/2011 | Wells, Jr. |
| 2011/0055825 | A1* | 3/2011 | Ikawa ................. H04N 1/00973 717/176 |
| 2011/0107299 | A1 | 5/2011 | Dehaan |
| 2011/0271270 | A1 | 11/2011 | Bowen |
| 2011/0271279 | A1 | 11/2011 | Pate |
| 2012/0030332 | A1 | 2/2012 | Fukushima et al. |
| 2012/0096455 | A1 | 4/2012 | Katsumata et al. |
| 2012/0102484 | A1 | 4/2012 | Hopmann et al. |
| 2012/0154375 | A1 | 6/2012 | Zhang et al. |
| 2012/0324376 | A1 | 12/2012 | Hong |
| 2013/0007430 | A1 | 1/2013 | Fan |
| 2013/0086658 | A1 | 4/2013 | Kottahachchi et al. |
| 2013/0151841 | A1 | 6/2013 | McGraw |
| 2013/0167134 | A1 | 6/2013 | Shim et al. |
| 2013/0238785 | A1* | 9/2013 | Hawk .................... G06F 9/5077 709/224 |
| 2013/0254759 | A1* | 9/2013 | Xu ............................ G06F 8/61 717/174 |
| 2013/0268745 | A1* | 10/2013 | Uehata ................ G06F 11/1441 713/2 |
| 2013/0289926 | A1* | 10/2013 | Maity ................. G06F 9/45533 702/130 |
| 2013/0339942 | A1 | 12/2013 | Brunsman et al. |
| 2014/0004825 | A1 | 1/2014 | Prakash et al. |
| 2014/0022942 | A1 | 1/2014 | Han et al. |
| 2014/0033321 | A1 | 1/2014 | Patidar et al. |
| 2014/0173753 | A1 | 6/2014 | Sanso et al. |
| 2014/0201365 | A1 | 7/2014 | Ashok et al. |
| 2014/0208303 | A1 | 7/2014 | Asayag et al. |
| 2014/0250436 | A1 | 9/2014 | Tang et al. |
| 2014/0252483 | A1 | 9/2014 | Nagumo |
| 2014/0279799 | A1 | 9/2014 | Thomas et al. |
| 2014/0282500 | A1* | 9/2014 | Parthiban ................ G06F 11/30 718/1 |
| 2014/0330732 | A1 | 11/2014 | Grignon |
| 2014/0330936 | A1 | 11/2014 | Factor et al. |
| 2014/0331337 | A1 | 11/2014 | Factor et al. |
| 2014/0359595 | A1* | 12/2014 | Sehgal ...................... G06F 8/61 717/171 |
| 2015/0012735 | A1 | 1/2015 | Tamir et al. |
| 2015/0026675 | A1 | 1/2015 | Csaszar |
| 2015/0040130 | A1* | 2/2015 | Ali ......................... G06F 21/575 718/1 |
| 2015/0067342 | A1 | 3/2015 | Pazdziora et al. |
| 2015/0074658 | A1 | 3/2015 | Gourlay et al. |
| 2015/0082396 | A1 | 3/2015 | Theebaprakasam et al. |
| 2015/0160960 | A1* | 6/2015 | Delco .................. G06F 9/45545 718/1 |
| 2016/0313918 | A1 | 10/2016 | Meshchaninov et al. |
| 2017/0111368 | A1 | 4/2017 | Hibbert et al. |

OTHER PUBLICATIONS

André Bottaro, Software Management of Heterogeneous Execution Platforms, 2009, pp. 618-623. https://ieeexplore.ieee.org/stamp/stamp.jsp?tp=&arnumber=5136717 (Year: 2009).*

Fujitsu SoftwareServerView Suite, "Remote Management iRMC S2/S3—integrated Remote Management Controller", User Guide—English, Jul. 2012, 426 pages.

Gujarathi et al., "Scripting Dell Update Packages", Systems Management, Dell Power Solutions, Oct. 2004, pp. 1-114.

International Search Report and Written Opinion received for PCT Application No. PCT/US2014/041300, dated Feb. 26, 2015, 9 pages.

OME Engineering Team, "Update Dell™ Server Hardware with Dell OpenManage Essentials", white Paper, Aug. 2013, pp. 1-38.

Stephen Walther, "asp.net MVC Controller Overview (C#)", Microsoft Docs, available online at K<https://docs.microsoft.com/en-us/aspnet/mvc/overview/older-versions-1/controllers-and-routing/aspnet-mvc-controllers-overview-cs>, Feb. 16, 2008, 6 pages.

* cited by examiner

ACTION EXECUTION BASED ON MANAGEMENT CONTROLLER ACTION REQUEST

CROSS-REFERENCE TO RELATED APPLICATION

This application is a Continuation of U.S. application Ser. No. 15/305,430, filed on Oct. 20, 2016, which is the National Stage of International Application No. PCT/US2014/041300, filed on Jun. 6, 2014, the content of which are incorporated herein by reference in its entirety. The Applicant hereby rescinds any disclaimer of claim scope in the parent application or the prosecution history thereof and advices the USPTO that the claims in this application may be broader than any claim in the parent application.

BACKGROUND

Computing systems utilize various software components. For example, low level firmware to interface with the hardware and drivers for hardware that may interface with an operating system. In some cases, it may be necessary to update the firmware or drivers on a computing system. For example, updates may provide additional capabilities. As another example, updates may correct errors, often referred to as bugs, in previous versions of the firmware or drivers.

DETAILED DESCRIPTION

Figure 1:
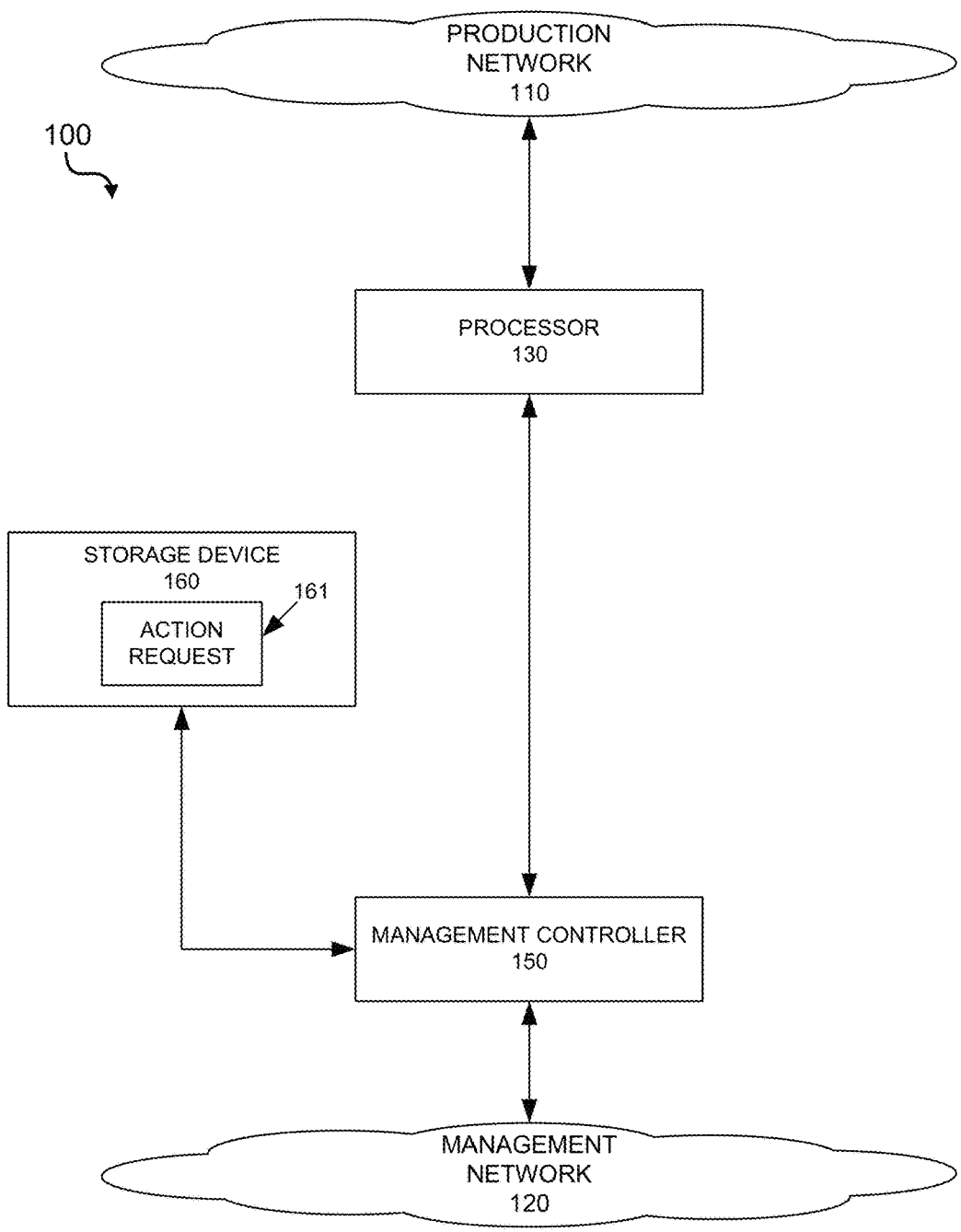
FIG. 1 is an example of a system that may utilize management controller action requests according to the techniques described herein.

One process for updating firmware, drivers, or configurations on a computing system, such as a server computer, may involve logging into the Operating System (OS) of the computer system using an account credential that grants administrator privileges. The administrator, often referred to as the root user, or superuser, is granted privileges on the computer system that may exceed those that are available to a general user account. For example, execution of certain programs on the system may be limited to users that have administrator privileges. Included in those privileges may be the authority to perform updates on the firmware and/or drivers or to make configuration changes on the computer system. For purposes of this description, administrator credentials or operating system administrator credentials, refers to the credentials needed to log into a computer system as an administrator, and thus be granted administrator privileges.

A user logged in as an administrator may then download any software used in updating the firmware and/or drivers. This downloaded data may be referred to as an update package, as it may include the data used to perform the firmware and/or driver update. This data may include an executable program that actually performs the update. The update package may be downloaded to the server computer over a network. The administrator user may then update the desired components or perform configuration updates on the computer. For the remainder of this disclosure, the term update or updating refers to updating of firmware and/or drivers, as well as altering the configuration of a server computer.

Several issues may arise when using the process described above. First, as mentioned above, a user with administrator credentials may be granted privileges on the computer system that exceed those of a normal user and may include privileges that go beyond those needed for updating the system. So, in order to allow a user to update the system, that user may receive the administrator credentials. However an issue arises in that by granting administrator privileges in order to update the system, all administrator privileges are granted as well. This is sub-optimal because a user that is responsible for updating the system, in many cases, should not be granted all the privileges associated with the administrator.

Another issue that arises is that often times the updating of the system may interfere with normal operation of the system. For example, performing an update may reduce the responsiveness of the system. In some cases, the update process may require that the system be restarted. These operations may impact the workloads that are being processed by the server. For example, in the cases where the server is restarted, that server is no longer available during the restart period. In some cases, one user may be responsible for updates, while another user is responsible for keeping the server available. It is difficult for both users to carry out their respective responsibilities if the user in charge of updates is able to affect the availability of the server, without input from the user responsible for maintaining the server's availability. Even though affecting the availability of the server when performing an update may be unavoidable, the user responsible for maintaining system availability may desire to have control over when that period of reduced availability occurs.

As yet another issue, if the download of an update package occurs over the same network that is being utilized by the server to process workloads, the available bandwidth on that network is reduced. Thus, downloading an update package may in and of itself interfere with the server's ability to process workloads.

The techniques described herein overcome these issues through the use of a utility program running on the server, in conjunction with a management controller and a storage device that is accessible to both the management controller and the processor on the server. A user responsible for updates may store or otherwise provide data indicative of the need for an update to a management controller. Providing the data indicative of the need to update may not require administrator credentials. The utility program, which may run as a program with administrator privileges, may detect the presence of the data indicative of the need for an update. In some implementations, the detection may be through periodic checks for the presence of the data indicative of the need for an update. The time and frequency of the utility program checking for the need to update may be controlled by a user responsible for maintaining availability of the system.

The update package may be downloaded to the system over a management network connected to the management controller. Thus, no bandwidth on the network used to process the server workload is used. The utility program may then determine when the update is to be applied, including determining when any restart of the system, if needed, occurs. Thus, availability of the system remains under control of the utility program, which in turn is configured by a user responsible for maintaining system availability. These techniques are described in further detail below and in conjunction with the appended figures.

FIG. 1 is an example of a system that may utilize management controller action requests according to the techniques described herein. System 100 may include a production network 110, a management network 120, a processor 130, a management controller 150 and a storage device 160. The processor 130 may be coupled to the production network. The production network may be utilized by the processor for executing workloads. The network may be a local area network, a wide area network, an intranet, or the Internet. The techniques described herein are not dependent on any particular type of production network. What should be understood is that the production network may be utilized in conjunction with the processor executing workloads assigned to the processor.

The processor 130 may be any type of processor that is included in a computer. For example, the processor may be a processor included in a server computer that executes instructions that allow the processor to process workloads. These instructions may include Operating System instructions. The processor may be coupled to a management controller 150. The management controller may itself be a processor, however the management controller may be used in the management of the processor. The management controller may not be used in the execution of workloads. The management controller may sometimes be referred to as a baseboard management controller or a lights out controller.

The management controller may be coupled to a storage device 160. The storage device may be any type of device capable of storing an action request 161. One example of a storage device may include a non-volatile memory, such as a flash memory, although techniques described herein are not dependent on any particular type of storage device. An action request may be an indication that an action is to be performed. For example, an action request may be a file, such as a script, which indicates that an action, such as an update action is to be performed. An action request may also be a command received by the management controller.

The management controller may be coupled to a management network 120. The management network may be utilized to manage the processor. An action request may be received by the management controller over the management network. In some implementations, the action request may be written to the storage device 160.

In operation, an action request may be received by the management controller. In some implementations the action request may be stored on the storage device coupled to the management controller. The action request may be received over the management network. The processor executing the operating system instructions may receive the action request. In some implementations, receiving the action request may include retrieving the action request from the storage device. In other implementations, the action request may be received by the management controller and sent to the processor. The processor may execute the action request. Execution of the action request may not require use of the production network.

Figure 2:
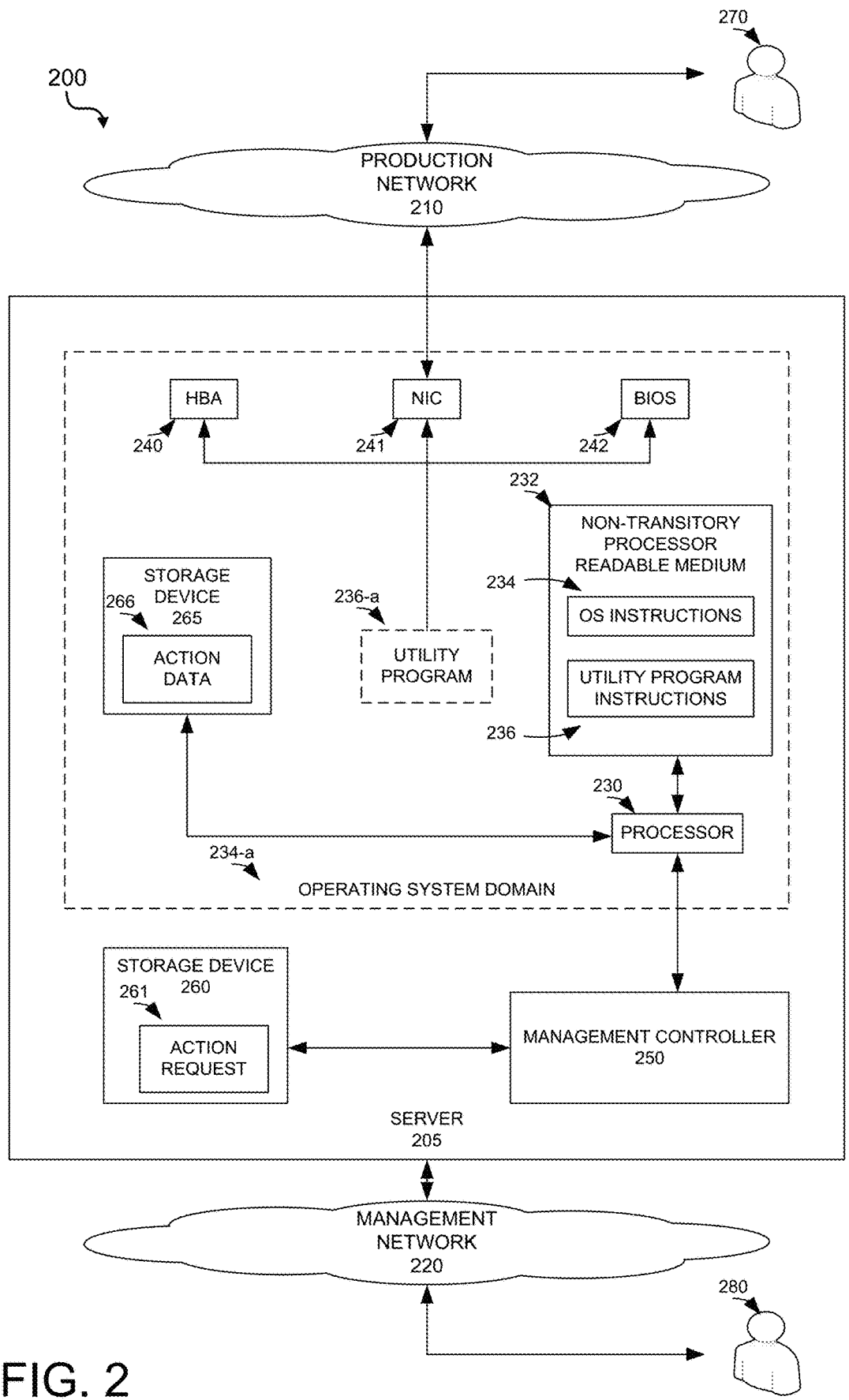
FIG. 2 is another example of a system that may utilize management controller action requests according to the techniques described herein.

FIG. 2 is another example of a system that may utilize management controller action requests according to the techniques described herein. System 200 may include components that are similar to those described with respect to FIG. 1. Like components are similarly numbered. System 200 may include a server computer 205. Many of the components described in FIG. 1 may be included in the server computer 205. For example, the server computer may include a processor 230, a non-transitory processor readable medium 232, a storage device 265, a plurality of components, such as an Host Bus Adaptor (HBA) 240, a Network Interface Controller (NIC) 241, and Basic Input Output System (BIOS) 242. The server computer may also include a management controller 250 and storage device 260. Just as above, system 200 may include a production network 210 and a management network 220.

Server computer 205 may be utilized to process a workload. One example workload may be a web server workload. Another example workload may be a database server workload. Techniques described herein are not dependent on any particular type of workload. What should be understood is that server 205 executes some desired workload processing functionality through the use of processor 230. The server 205 may be connected to the external world through production network 210. For example, requests for workload processing may be received over the production network and the results of that workload processing may be returned over the production network.

The processor 230 may be coupled to a non-transitory processor readable medium 232. The medium 232 may contain thereon a set of instructions, which when executed by the processor cause the processor to execute the functionality described herein. For example, the medium 232 may include operating system instructions 234 which cause the processor to implement an operating system domain 234-a on the server computer. The instructions may also include utility program instructions 236, which may cause the server to implement a utility program 236-a executing under control of the operating system. The utility program may execute with operating system administrator privileges. Operation of the utility program is described in further detail below.

The processor may also be coupled to storage device 265. Storage device 265 may be any type of storage device, including non-volatile memory, such as flash memory, volatile memory, such as dynamic or static random access memory (SRAM or DRAM), persistent memory, such as a hard or solid state disk drive, or any other type of storage that may be used to store action data 266. Action data may be data used in the execution of an action. For example, in the case of performing a firmware update, the action data may include the updated firmware package that is to be installed. Use of the action data is described in further detail below.

The processor may also be coupled to a management controller 250. As explained above, the management controller may be used to execute management operations on the server 205. The management controller may also be coupled to a storage device 260. Storage device 260 may be similar to storage device 265, with the exception that storage device 260 may be written to from the management controller by a user that does not have administrator credentials. Storage device 260 may include an action request 261, indicating that an action is to be performed by the utility program. Operation of the action request is described in further detail below.

As above, the management controller 250 may be coupled to a management network 220 that is separate from production network 210. Thus, any bandwidth consumed on the management network does not impact the bandwidth available on the production network. For purposes of description, FIG. 2 depicts two users. An administrator 270 is a user that has administrator credentials and is able to exert full control over the system. In other words, user 270 may be considered the root user. An action request user 280 is a user that does not have administrator credentials for server 205. However user 280 does have the permissions needed in order to store an action request 261 on the storage device 260 or to otherwise send an action request to the management controller 250. Although users 270, 280 are depicted as human users, it should be understood that the techniques described herein are not limited to human users. The techniques are equally applicable in the case where the actions of users 270, 280 are performed programmatically.

In operation, the administrator 270 may configure operation of the utility program 236-*a*. For example, the configuration may include determining how often the utility program is to check the storage device 260 for the presence of an action request 261. The configuration may also include receiving action requests directly from the management controller. The utility program may also be configured to perform the action specified in the action request 261 at a specified time of day. The utility program may also be configured to allow the action request to immediately trigger an action. The utility program may also be configured to reboot the server 205 at a specified time after executing the action specified by the action request. What should be understood is that administrator 270 controls configuration of utility program 236-*a*, and as such controls when an action request, including any associated effects on the availability of the system, is executed.

The action request user 280 may store an action request 261 on storage device 260 by accessing that storage device through the management controller 250. The access may occur over the management network, such that no bandwidth on the production network is used. In some implementations, the action request may bypass storage device 260 and be sent directly to the utility program 236-*a*. The action request may specify a time at which the action is to be performed. For example, the action request may specify that the action should be performed on or after a particular time of a particular day. The action request may also specify that the action is to be performed immediately. However, as will be explained in further detail below, the utility program 236-*a*, as configured by administrator 270, is the final arbiter of when an action is to be performed.

The action request may be in the form of a script. The script may include data that is used by the utility program in order to execute the action. For example, in the case of an update of the firmware of the various peripherals 240-242 of the server 205, the action request script may inform the utility program as to a storage location from which the updated firmware may be retrieved. For example, the script may include a network location from where the updated firmware package may be downloaded. For purposes of this description, data used in the execution of the action request is referred to as action data 266. In the case of a firmware update, the action data may be the updated firmware package. However, techniques described herein are not limited to firmware updates only. Any type of action which may need administrator credentials could make use of the techniques described herein. For example, the action request may be a list of configuration settings and the utility program knows how to apply those settings to the server 205.

The utility program 236-*a* may download any needed action data to the storage device 265 though the management controller 250 and the management network 220. Thus, downloading the action data does not consume any bandwidth on the production network, leaving that bandwidth available for processing the workload that is assigned to the server.

In order to aid in the description of the techniques presented herein, an example of a driver update is described. For example, the driver update may be to update the HBA 240, NIC 241 or BIOS 242. For purposes of this description, it should be assumed that administrator credentials are needed in order to update the drivers. It should also be assumed that the action request user 280 does not possess the administrator credentials, even though the action request user is authorized to request updates to the server. It should be understood that administrator 270 remains in control of if and/or when the action request is executed through the configuration of the utility program 236-*a*.

The process may start with the update user writing an action request 261 to the storage device 260. The update user may access the storage device 260 via the management controller 250. Administrator credentials may not be needed to write the action request to the storage device. In an alternate example, the action request may be sent from the management controller to the utility program, thus bypassing the storage device. The action request may specify the action to be performed. In the present example, the action to be performed may be a firmware update to one or more of the plurality of components described above. However, it should be understood that the action request could be any of the different types of updates mentioned above. The action request may be in the form of a script. The script may specify the action to be performed and the location of any action data 266 needed to perform the action. In addition, the script may specify a time when the action is to be performed. For example, the script may specify that the action is to be performed after a defined time. Alternatively, the script may specify the action is to be performed immediately. Although the action script may specify a time that the action is to be performed, it should be understood that this time is when the action request user prefers that the update is to be performed. Final determination of when the action is actually performed is based on the configuration of the utility program 236-*a*, as configured by the administrator user 270.

As mentioned above, in one implementation, the utility program is configured by the administrator user 270 to periodically check the storage device 260 for the presence of an action request 261. The particular period is relatively unimportant to the techniques described herein. For example, the period may be every minute, every five minutes, hourly, daily, weekly, monthly, or any other period. In other implementations, the action request may be sent directly from the management controller to the utility program. Upon determining that an action request is available, the utility program may determine when the action is to be performed.

Determining when the action is to be performed may include determining if any specified time is included in the action request. For example, the action request may desire that the action is performed immediately (e.g. in the case of a security update, it may be desirable to apply the update as quickly as possible). The action request may alternatively specify that the action should be performed after a specified time (e.g. update after midnight on Friday). Regardless of when the action request specifies that the action is to be performed, it should be understood that this is simply an input into the utility program. The utility program makes the final determination as to when the action request is to be performed.

While waiting for the determined time to arrive, the utility program may download any needed action data 266 to storage device 265. For example, in the case of a firmware update, the action data may be the updated firmware package. The utility program may download the action data to the storage device by utilizing the management network 220. Thus, no bandwidth on the production network 210 is used to download the action data. As mentioned previously, the action request 261 itself may specify the location of the action data. Thus, the utility program need not know in advance the location of the action data.

Upon arrival of the determined time, the utility program may initiate the action request. For example, in the case of a firmware update, the utility program may begin the update process. The utility program may make use of the action data 266 that had been previously downloaded. However, it should be understood that downloading the action data in advance is not required. In some example implementations, the action data may not be downloaded until the determined time has arrived. In some implementations, the utility program may write an indicator to the storage device 260 to indicate that the action request is in progress. The action request user 280 may retrieve this indication to determine if the action request is in progress.

It should be understood that the utility program is able to run with administrator privileges. Thus, even though the action request was initiated by the action request user 280 who has privileges to access the management controller, but who does not have administrator privileges, the action is performed using administrator credentials. As such, the action request user was able to initiate an action on the server 205 that needs to execute with administrator credentials without the administrator credentials every being provided to the action request user.

Some action requests may need the server 205 to restart in order to take effect. The utility program may be configured by the administrator user 270 to specify when a restart is to actually occur. Thus the administrator user 270 remains in charge of any period of unavailability of the server due to processing the action request. In some implementations, once the action request is completed, including any restart if needed, the utility program may write an indication of completion to the storage device 260. The action request user 280 may retrieve this indication to determine if the action request has completed.

Figure 3:
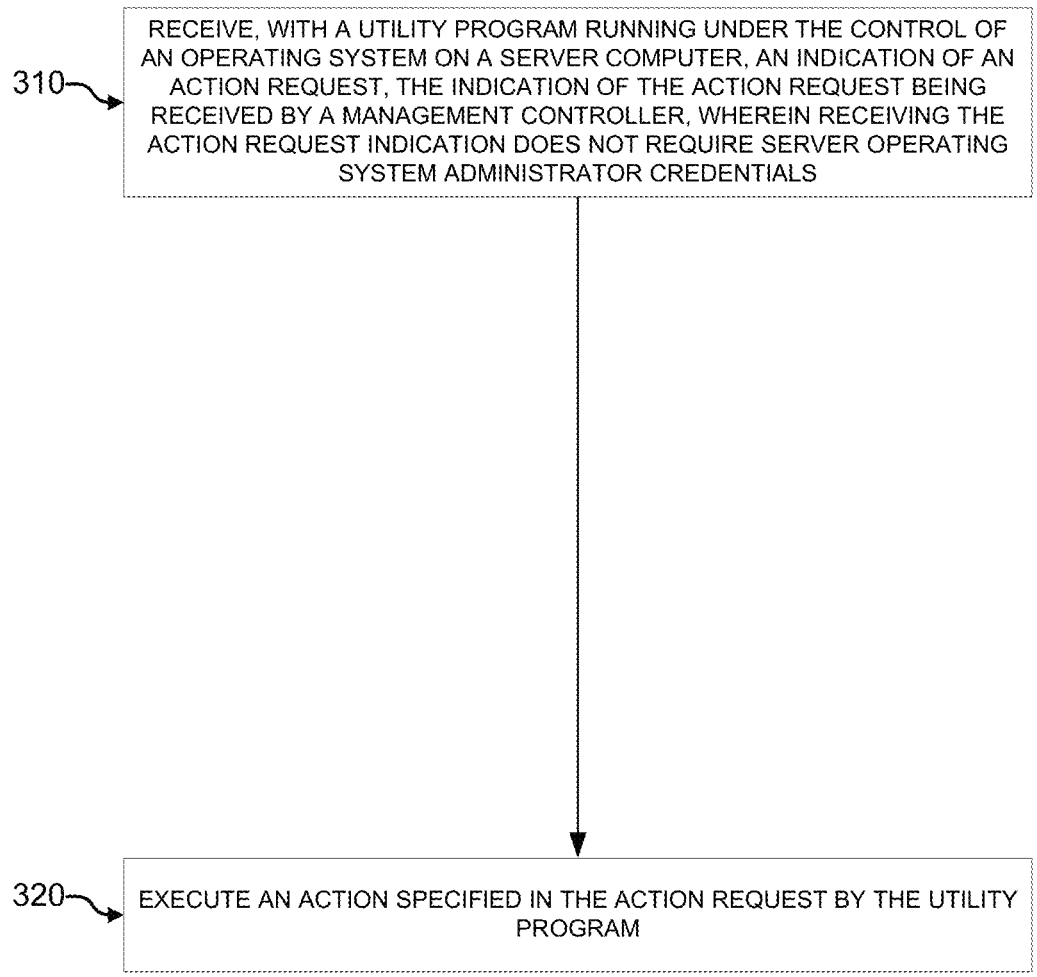
FIG. 3 is an example of a high level flow diagram for receiving and executing an action according to the techniques described herein.

FIG. 3 is an example of a high level flow diagram for retrieving and executing an action according to the techniques described herein. In block 310, a utility program operating under the control of an operating system on a server computer may receive an indication of an action request. For example, the action request may be in the form of a script, as described above. The action request may have been received by a management controller. For example, the action request indication may have been received by the management controller and stored in a non-volatile memory associated with the management controller. In other examples, the action request may bypass storage, and be sent directly from the management controller to the utility program.

Receiving the action request by the management controller may not require server operating system administrator credentials. In other words, the action request indication may be received by the management controller and, in some implementations, stored on the management controller accessible storage, by an entity (either a person or program) that does not have administrator credentials for the operating system running on the server. In block 320, an action specified in the action request may be executed by the utility program. The utility program may run with operating system administrator credentials, thus allowing completion of actions that require operating system administrator credentials.

Figure 4:
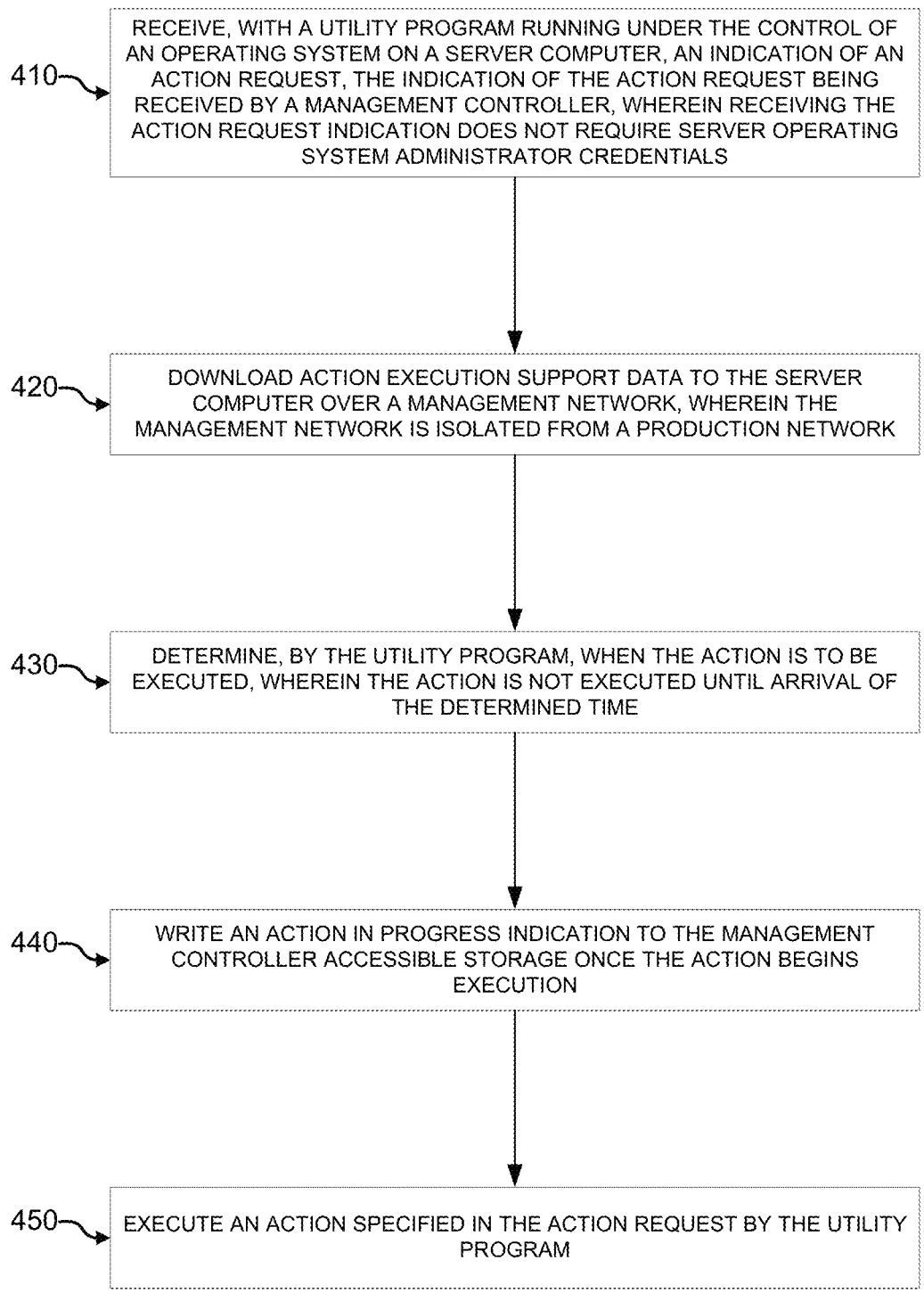
FIG. 4 is another example of a high level flow diagram for receiving and executing an action according to the techniques described herein.

FIG. 4 is another example of a high level flow diagram for retrieving and executing an action according to the techniques described herein. In block 410, just as above in block 310, a utility program operating under the control of an operating system on a server computer may receive an indication of an action request. The action request may have received by a management controller. Receiving the action request in the management controller may not require server operating system administrator credentials.

In block 420, action execution support data may be downloaded to the server computer over a management network. The management network may be isolated from the production network. In other words, any files or other data needed to complete the action request may be downloaded to the server. This download may occur over the management network, and as such does not consume any bandwidth on the production network. For example, in the case of a driver update, the updated driver files may be downloaded to the server over the management network. It should be understood that the techniques described herein are not limited to driver updates and are applicable to any data needed in order to execute the action request.

In block 430, the utility program may determine when the action is to be executed. The action may not be executed until arrival of the determined time. As mentioned above, determining when the action is to execute may include examining the action request itself as well as configuration parameters for the utility program. For example, the utility program may specify that the action is to be performed once a week, at a specified time, unless the action request specifies a different level of urgency. What should be understood is that the utility program examines all configuration settings and information in the action request and determines when the action is to be executed.

In block 440, an action in progress indication may be written to the management controller accessible storage once the action begins execution. This ensures that should the action request fail for some reason, the utility program is made aware that the action had already been started, thus preventing the utility program from re-executing the action request. In block 450, the action specified in the action request may be executed by the utility program. Execution of the action may utilize the support data downloaded in block 420.

Figure 5:
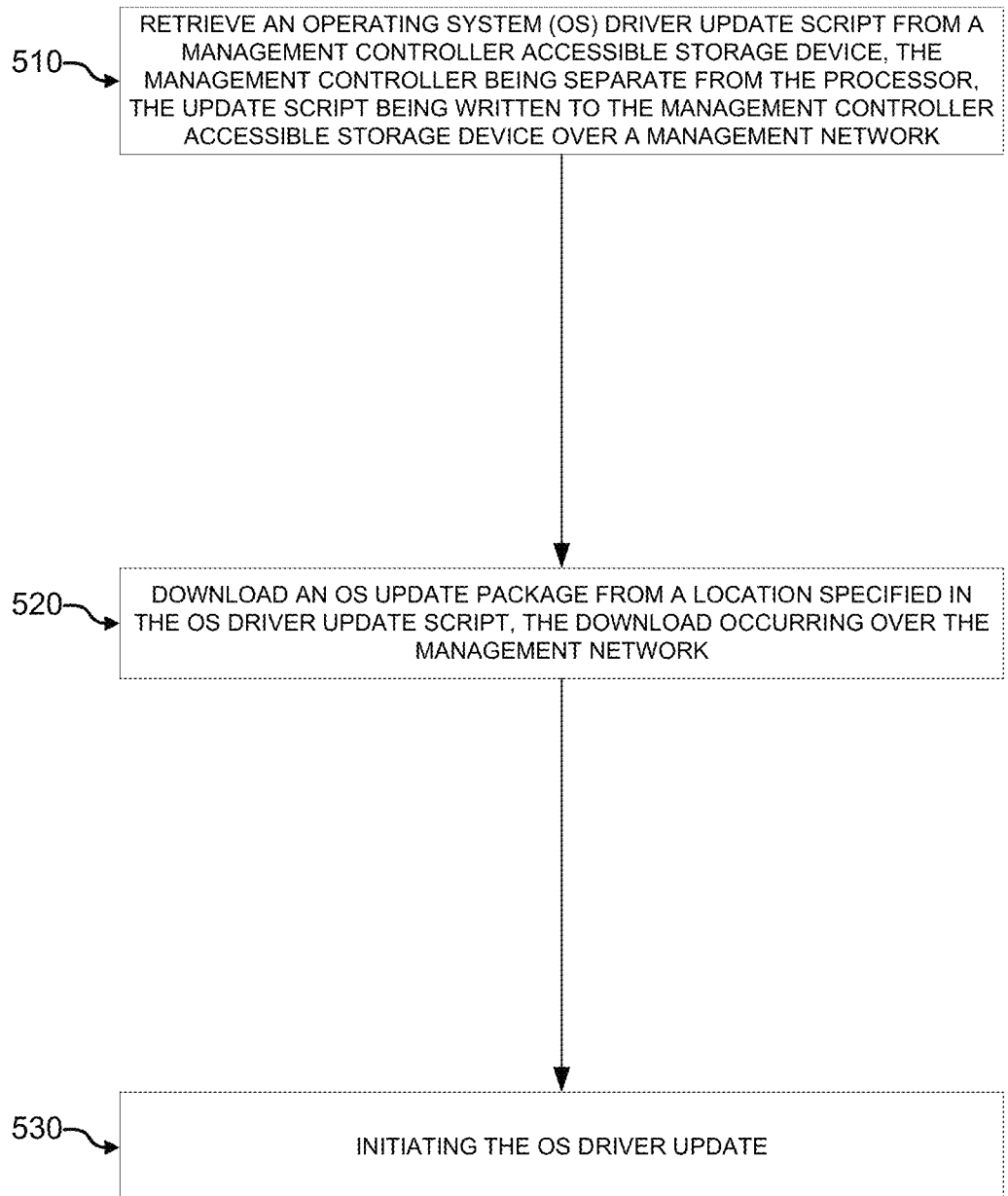
FIG. 5 is an example of a high level flow diagram for updating operating system driver updates according to the techniques described herein.

FIG. 5 is an example of a high level flow diagram for updating operating system driver updates according to the techniques described herein. In block 510 an operating system driver update script may be retrieved from a management controller accessible storage device. For example, the management controller accessible storage device may be a non-volatile memory. The management controller may be separate from the processor, meaning that the system includes at least two separate processors. One of those processors being the management controller and at least one other processor not dedicated to management functions.

The update script may be written to the management controller accessible storage device over a management network. As explained above, the management network may be separate from a production network. By downloading the script over the management network, no bandwidth on the production network is used.

In block 520, an OS update package may be downloaded from a location specified in the OS driver update script. The download may occur over the management network. Just as above, because the download occurs over the management network, no bandwidth on the production network is used by the download of the update package. Furthermore, because the location of the update package may be specified by the update script, it is not necessary to know the location of the update package in advance. In block 530, the OS driver update may be initiated.

Figure 6:
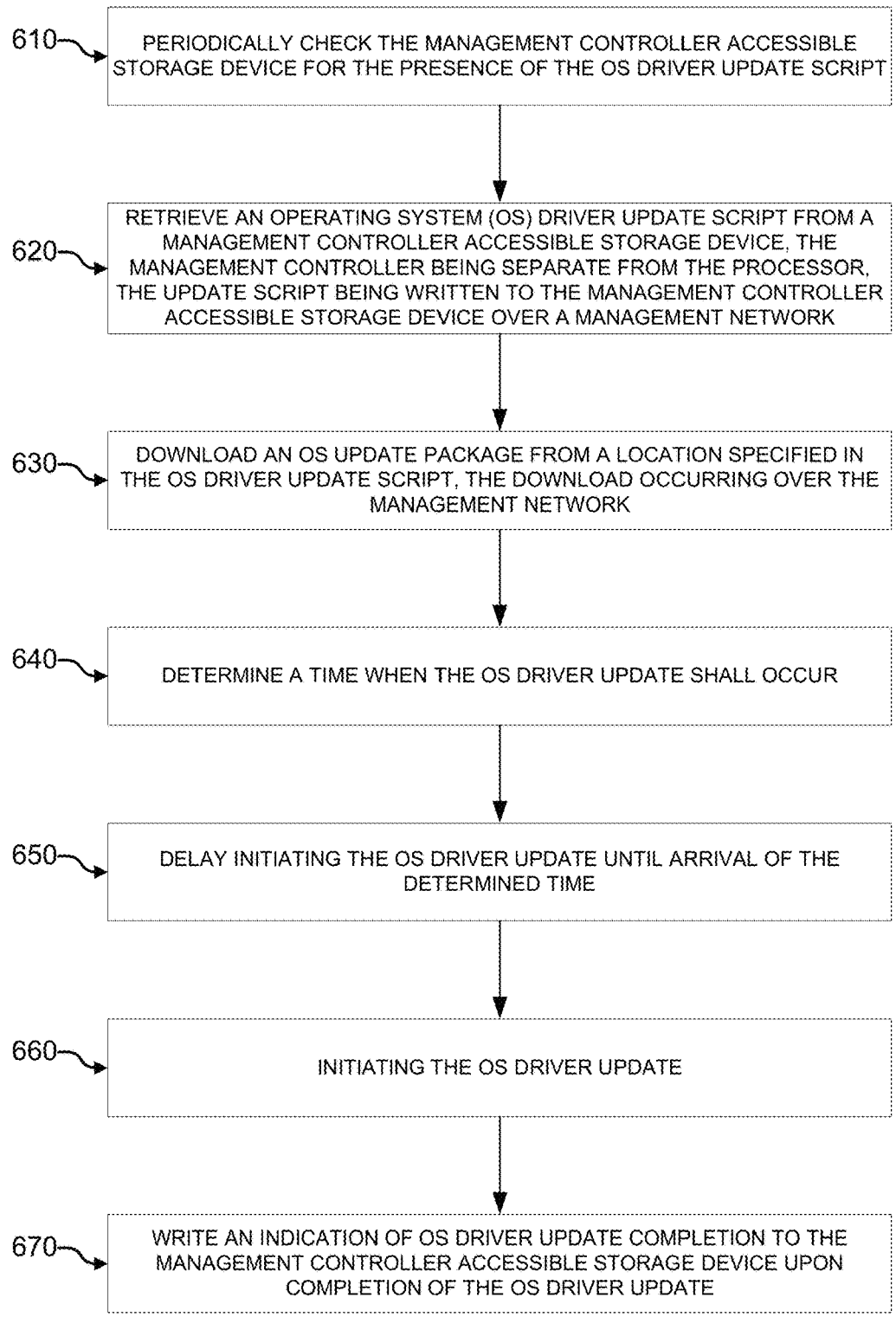
FIG. 6 is another example of a high level flow diagram for updating operating system driver updates according to the techniques described herein.

FIG. 6 is another example of a high level flow diagram for updating operating system driver updates according to the techniques described herein. In block 610, a management controller accessible storage device may be periodically checked for the presence of an OS driver update script. In block 620, just as above in block 510, an operating system driver update script may be retrieved from a management controller accessible storage device. The management controller may be separate from the processor. The update script may be written to the management controller accessible storage device over a management network. The management network may be separate from a production network.

In block 630, as above in block 520, an OS update package may be downloaded from a location specified in the OS driver update script. The download may occur over the management network. Just as above, no bandwidth on the production network is used by the download of the update package. Also just as above, it is not necessary to know the location of the update package in advance, because it is specified in the update script.

In block 640, a time when the OS driver update shall occur may be determined. The time may be determined based on a time included in the update script itself, a priority of the update, and the configuration of the update utility. In block 650, initiation of the OS driver update may be delayed until the arrival of the determined time. In block 660, the OS driver update may be initiated. The OS driver update may include updating drivers with those contained in the OS update package that was downloaded in block 630. In block 670, an indication of OS driver update completion may be written to the management controller accessible storage location upon completion of the OS driver update.

We claim:

1. A method comprising:
receiving an indication of an action request at a management controller processor within a server from a first user without administrator privileges of a server operating system executing on a processor of the server via a management network,
wherein the administrator privileges required to execute a complete action are specified in the action request;
receiving a workload request provided by a second user with administrator privileges via a production network, wherein the workload request and the production network are isolated from the management network, and
wherein the action request and management network are isolated from the production network;
downloading action execution support data to the server over the management network via the management controller processor,
wherein the management network is isolated from the production network utilized by the processor of the server when executing the workload request,
wherein the processor is separate from the management controller processor that received the action request over the management network;
sending the action request from the management controller processor to a utility program executing in a domain of the server operating system; and
executing an action specified in the action request by the utility program by the server operating system.

2. The method of claim 1, wherein the action specified in the action request is a software update request.

3. The method of claim 1, further comprising:
determining, by the utility program, when the action is to be executed, wherein the action is not executed until arrival of a determined time.

4. The method of claim 3, wherein the action request indicates immediate execution, the immediate execution indication causing the utility program to expedite action execution.

5. The method of claim 3, wherein the action request indicates delayed execution, the delayed execution indication causing the utility program to delay action execution until after a time specified in the action request.

6. The method of claim 3, further comprising:
writing, by the utility program, an action in progress indication to a management controller processor accessible storage device once the action begins execution.

7. A non-transitory processor readable medium containing instructions that when executed by a processor of a server cause the processor to:
retrieve an Operating System (OS) driver update script from a storage device accessible by a management controller processor separate from the processor, wherein the server includes the management controller processor;
wherein the OS driver update script is written to the storage device over a management network by the management controller processor responsive to a request from a first user without administrator privileges to an OS to execute on the processor,
wherein the management network is separate from a production network that carries network traffic associated with a workload executed using the OS,
wherein the administrator privileges are required to perform an OS driver update requested by the OS driver update script;
download an OS update complete package from a location specified in the OS driver update script, the download occurring over the management network via the management controller processor; and
initiate the OS driver complete update script by a utility program that has the administrator privileges.

8. The non-transitory processor readable medium of claim 7, further comprising instructions that when executed cause the processor to:
process the workload request with the processor;
wherein the utility program examine one or more configuration parameters to determine a time when the complete OS driver update is to initiate; and
write an indication of OS driver update completion to the storage device in response to completing the update of the OS driver update, wherein the utility program determines a time at which the OS driver complete update script is initiated.

9. The non-transitory processor readable medium of claim 8, further comprising instructions that when executed cause the processor to:
delay initiating the OS driver complete update script until occurrence of the determined time.

10. The non-transitory processor readable medium of claim 7, further comprising instructions that when executed cause the processor to:
receive, over a production network, a workload request for the workload provided by a second user with administrator privileges, wherein the workload request and the production network are isolated from the management network, and wherein the OS driver update script and management network are isolated from the production network.

11. The non-transitory processor readable medium of claim 10, wherein writing the OS driver update script to the storage device does not require OS administrator credentials and initiating the OS driver complete update does require the OS administrator credentials.

12. The non-transitory processor readable medium of claim 7, further comprising instructions that when executed cause the processor to:
periodically check the storage device for presence of the OS driver update script.

13. The non-transitory processor readable medium of claim 7, further comprising instructions that when executed cause the processor to download the OS driver update script over the management network separate from the production network utilized by the processor to execute the workload request.

14. A server comprising:
a baseboard management controller coupled to a management network;
a first storage device coupled to the baseboard management controller wherein an action request received over the management network is stored in the first storage device by the baseboard management controller;
a processor coupled to the baseboard management controller and a production network, wherein the processor executes an operating system, retrieves the action request from the storage device, and executes the action request without use of the production network,
wherein a privilege of the operating system is required by for executing the action request by the processor, but is not required to place the action request on the first storage device,
wherein the processor is coupled to the production network using a separate network interface card than the baseboard management controller and the management network; and
a utility program that is executed by the processor in a domain of the operating system and includes the privilege, and
wherein the utility program examines configuration parameters to determine a time at which to perform the action request.

15. The server of claim 14, further comprising:
a second storage device wherein data used in the execution of the action request is downloaded to the second storage device over the management network.

16. The server of claim 14, further comprising a plurality of devices coupled to the processor, wherein the action request is to update drivers associated with the plurality of devices, wherein writing the action request to the first storage device does not require administrator credentials.

17. The server of claim 14, where initiating the action request to update drivers does require the privilege and the privilege is held by the utility program that initiates the action request.

* * * * *